Feb. 11, 1941.  F. R. ZIMMERMAN  2,231,744
SPRING COUPLING MACHINE
Filed Nov. 20, 1939  8 Sheets-Sheet 1

Inventor:
Fred R. Zimmerman,
By: Rudolph M. Lotz
Attorney.

Witness:
E. Camporini

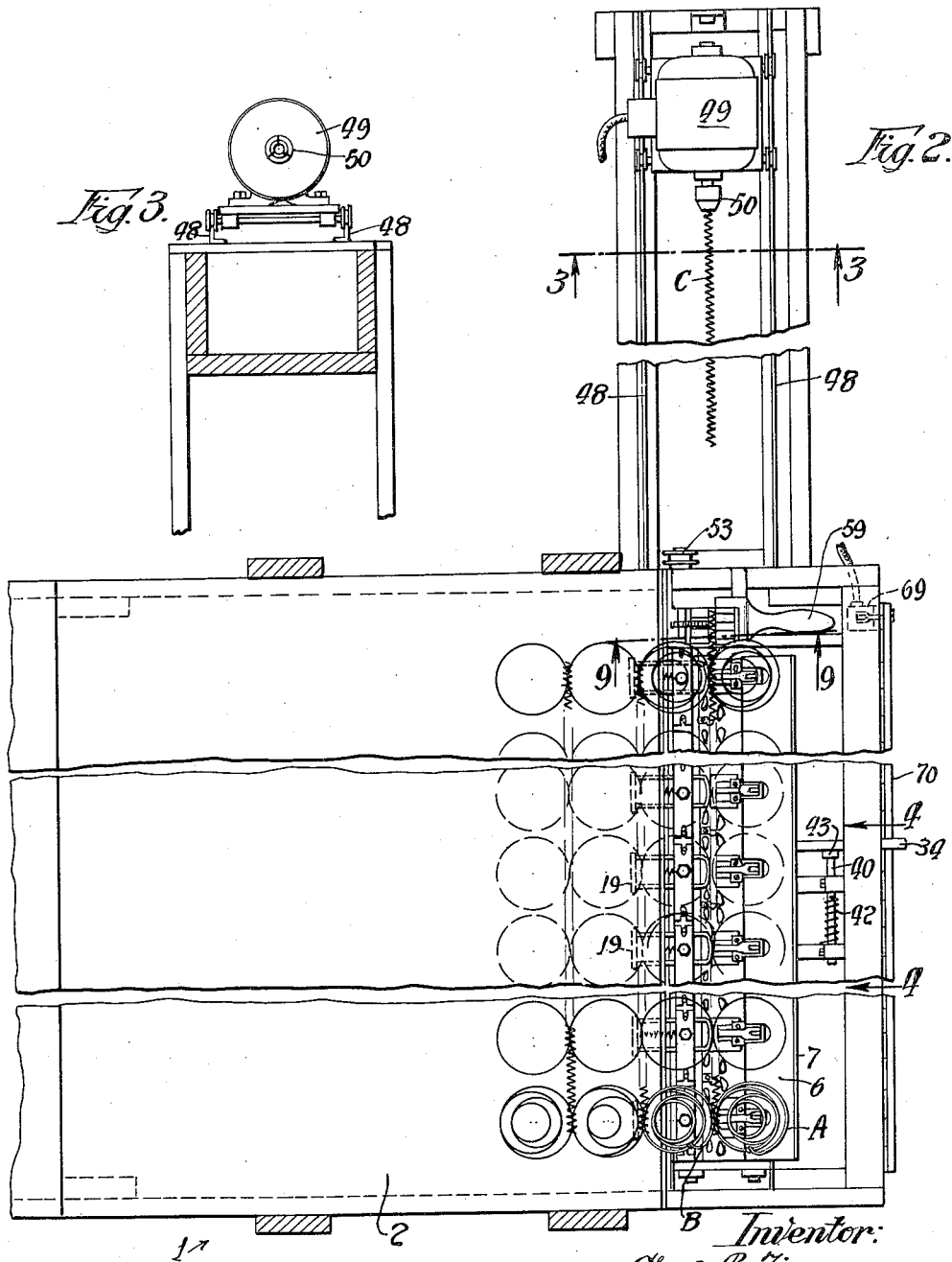

Feb. 11, 1941.   F. R. ZIMMERMAN   2,231,744
SPRING COUPLING MACHINE
Filed Nov. 20, 1939   8 Sheets-Sheet 3

Witness:
E. Camporini

Inventor:
Fred R. Zimmerman,
By Rudolph M. Lotz
Attorney

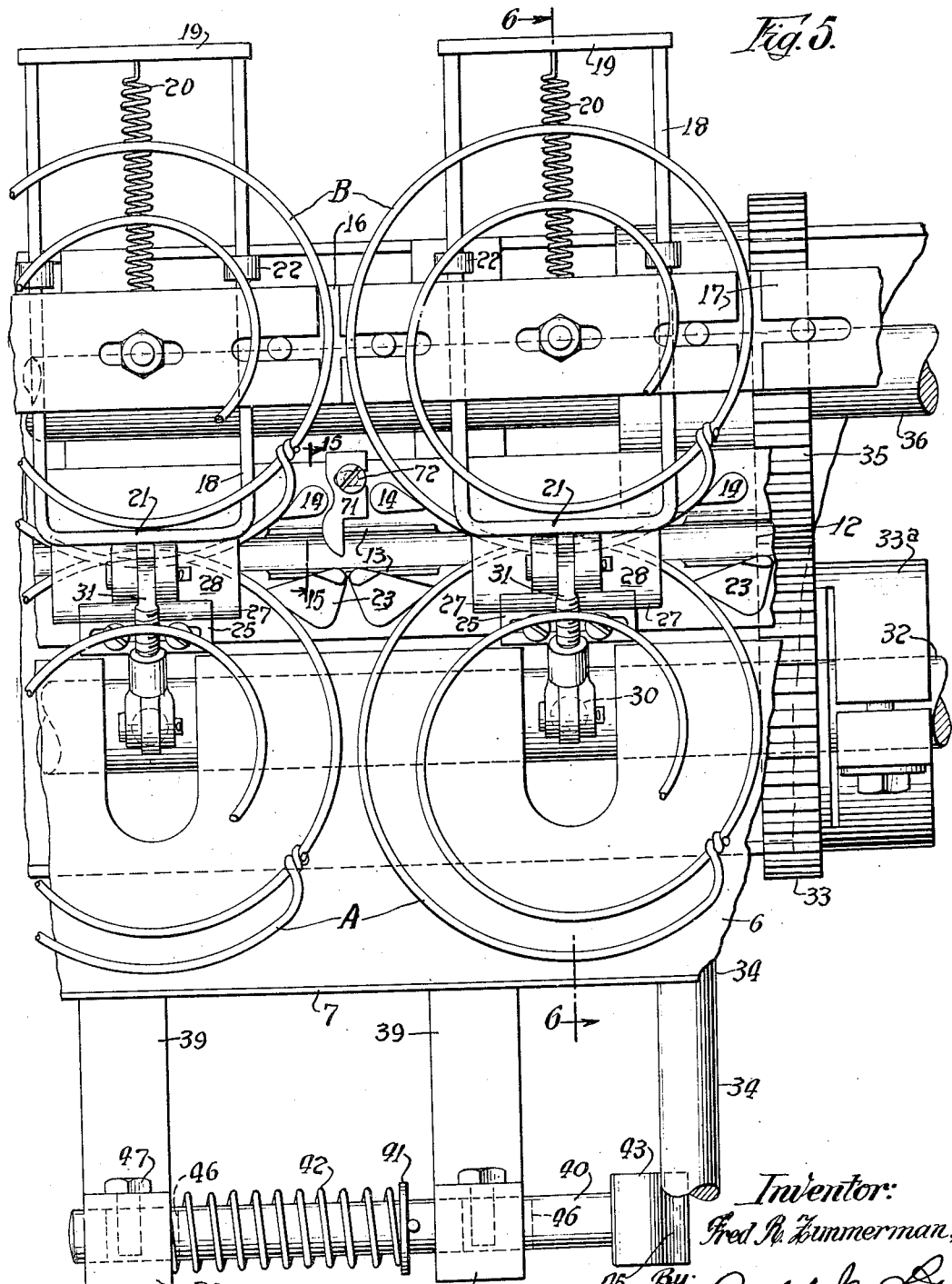

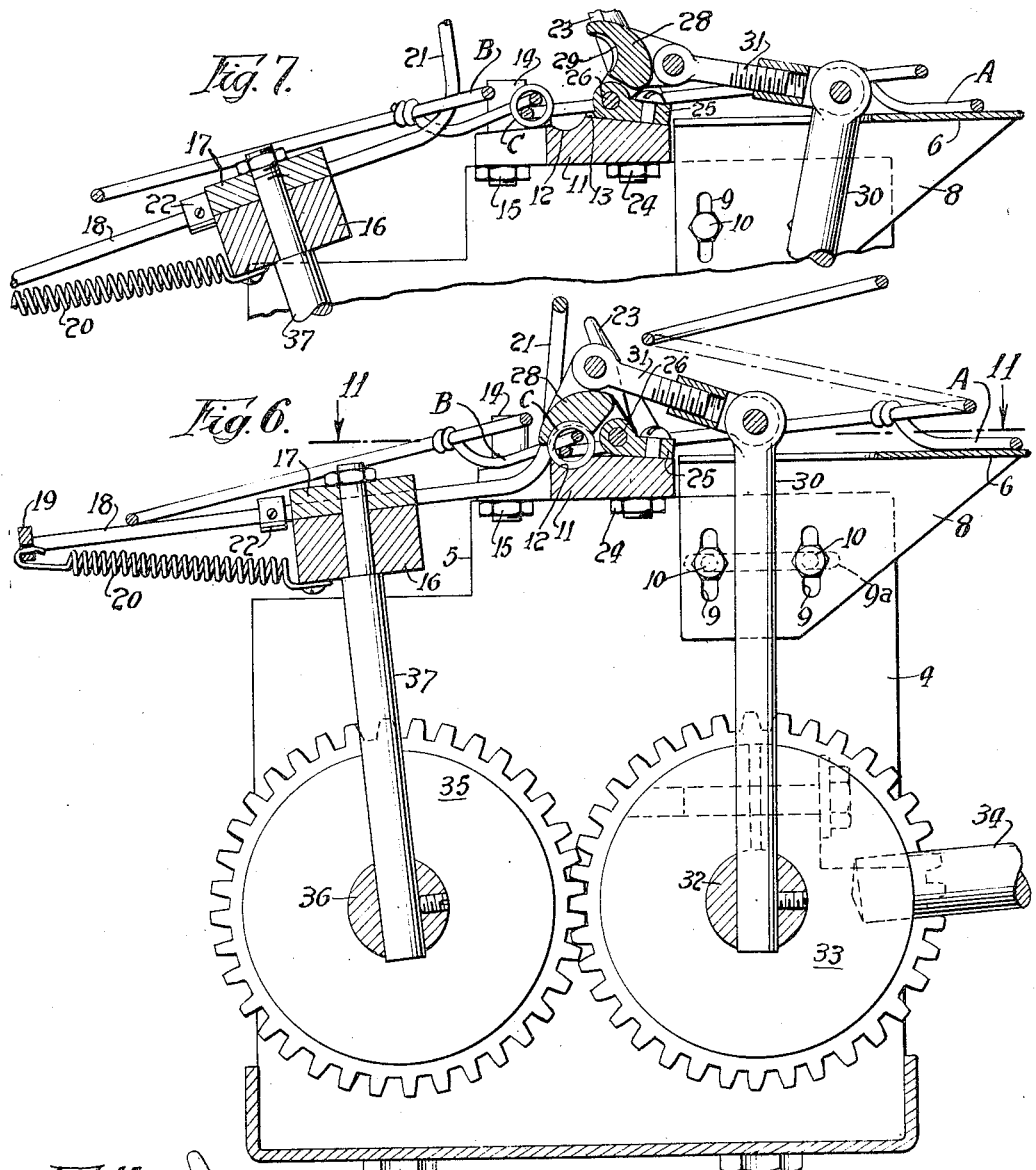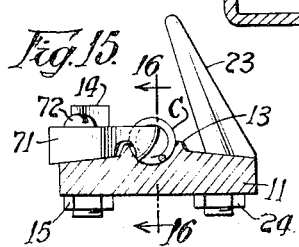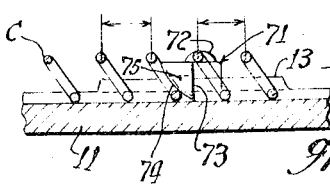

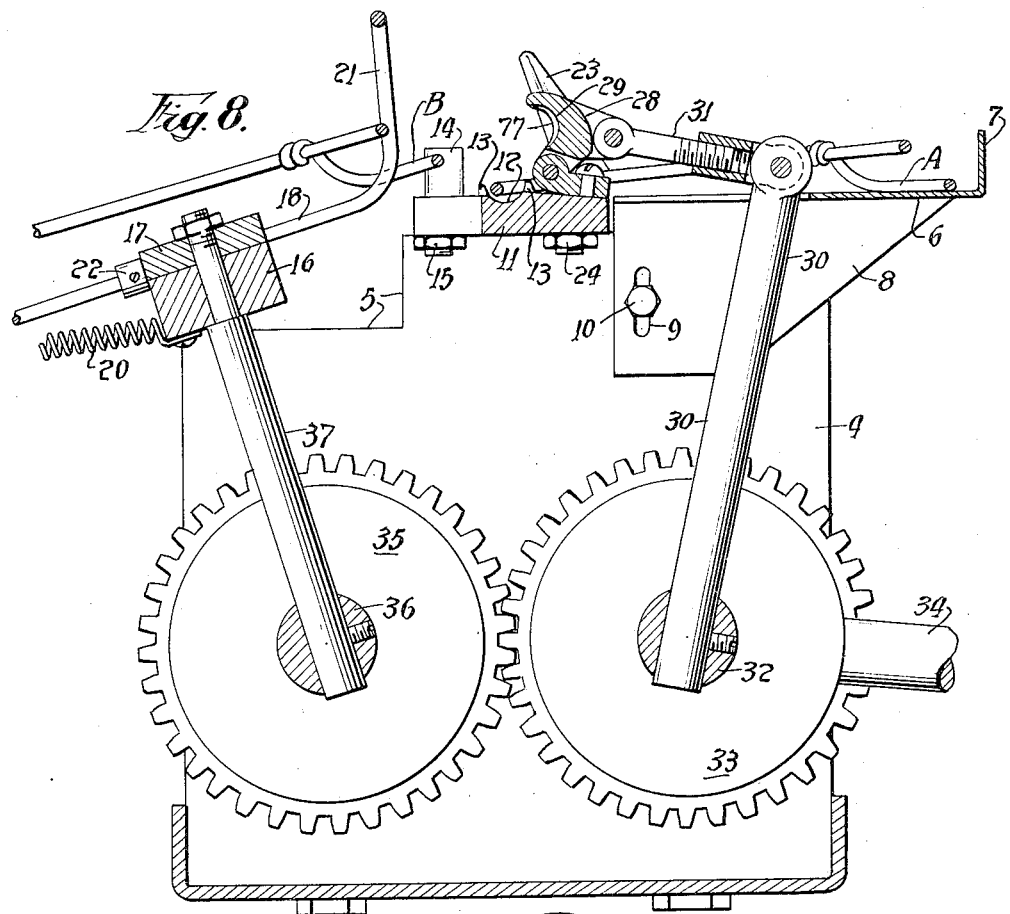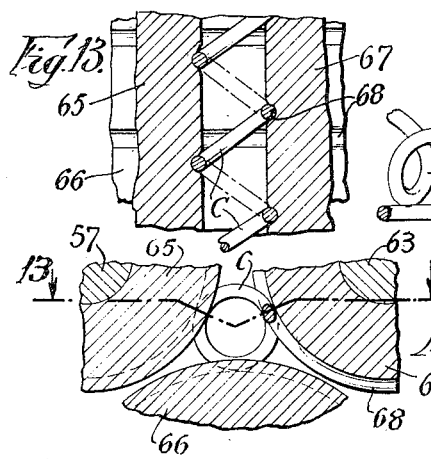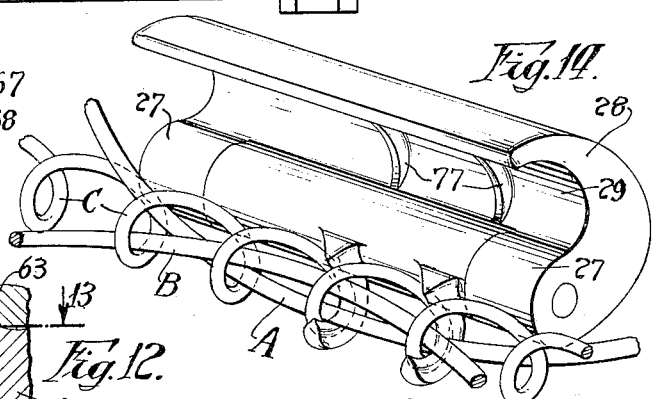

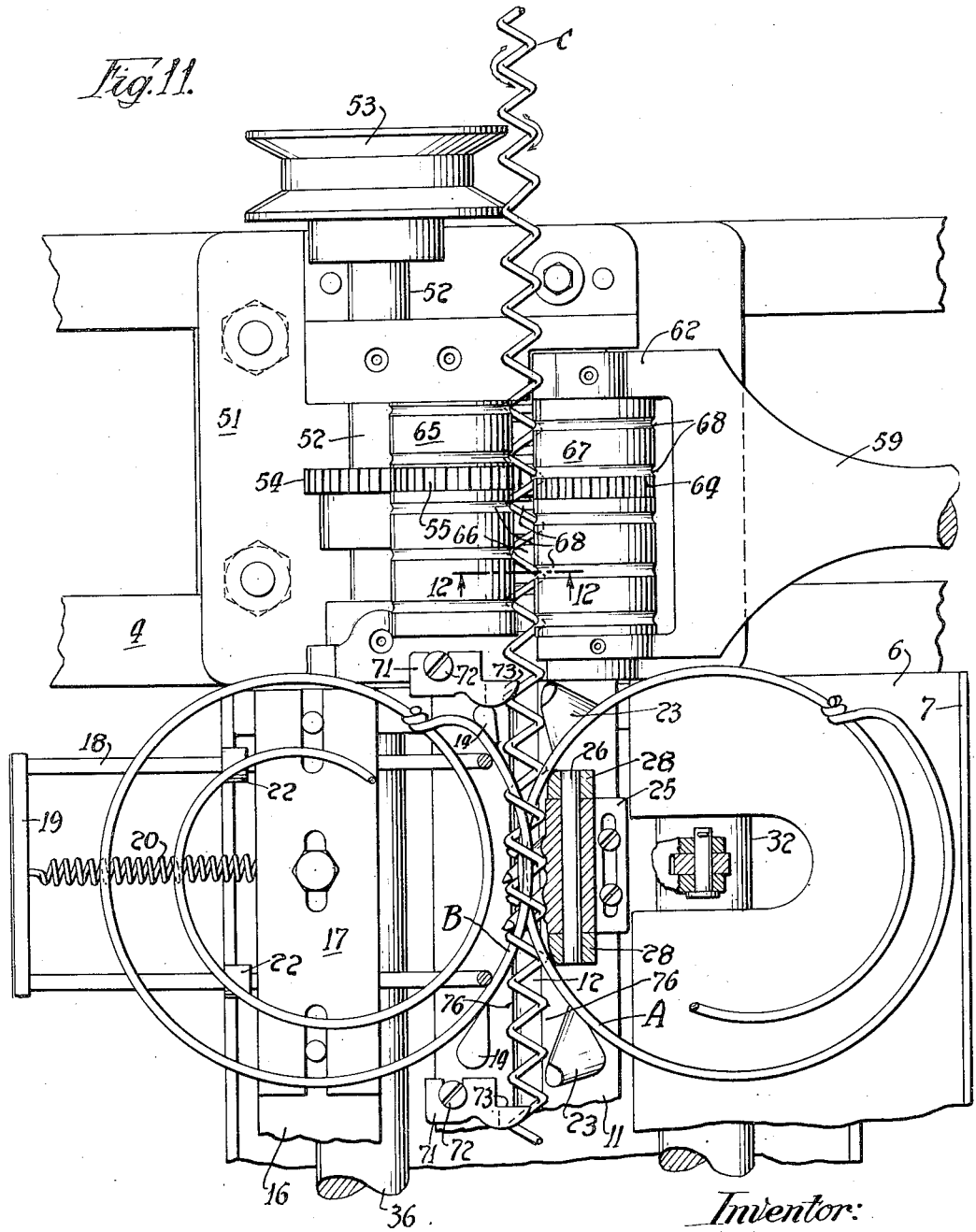

Patented Feb. 11, 1941

2,231,744

UNITED STATES PATENT OFFICE 2,231,744

SPRING COUPLING MACHINE

Fred R. Zimmerman, Chicago, Ill., assignor to Nachman Springfilled Corporation, Chicago, Ill., a corporation of Illinois Application November 20, 1939, Serial No. 305,298

16 Claims. (Cl. 140—3)

This invention has for its main object to provide a mechanism for coupling successive rows of upholstery springs by means of helical tie wires which encircle overlapped portions of terminal coils of the springs of adjacent rows in such manner that the springs of the two rows will be maintained accurately and equally spaced apart longitudinally of said rows and in such manner that the axes of the springs of the two rows will be equally spaced from each other in parallel vertical planes and which are equally spaced apart within the limits of accuracy or range of tolerances that result from slight differences in the upholstery springs.

A further object of the invention is to provide guiding means for the helical tie wire and means for disposing and maintaining the overlapped portions of the terminal coils of the rows of springs in such position relatively to the said guiding means as to cause the overlapped portions of each pair of springs of the two rows to be encircled by the same number of coils of the helical tie wire.

A further object of the invention is to provide means associated with the guide for the helical tie wire for automatically overcoming difficulty arising out of slight variations in pitch of the helical tie wire and thereby causing the same to encircle the overlapped portions of the two rows of springs smoothly and uninterruptedly.

Another object of the invention is to provide power actuated means for effecting rotation of the helical tie wire with sufficient force to overcome the frictional resistance to its encircling of the overlapped portions of the springs of the two rows to be coupled.

Other objects and advantages of the invention are specifically pointed out in or will be readily understood from the following specification.

A suitable embodiment of the invention is illustrated in the accompanying drawings, wherein:

Fig. 2 is a plan sectional view of the same with parts broken away, taken on the line 2—2 of Fig. 1.

Fig. 3 is a fragmentary vertical sectional view taken on the line 3—3 of Fig. 2.

Fig. 5 is a fragmentary detail plan view of the parts illustrated in Fig. 4 and disposed in the same relative positions as in the latter.

Fig. 6 is a fragmentary detail vertical sectional view taken on the line 6—6 of Fig. 5.

Fig. 7 is a view similar to Fig. 6 showing the parts illustrated in the latter in another or open position.

Fig. 8 is a view similar to Figs. 6 and 7 showing still another relative position of said parts.

Fig. 11 is a fragmentary plan view on the same scale as Figs. 9 and 10, showing the mechanism illustrated in the latter and other parts of the machine immediately adjacent thereto.

Fig. 12 is a fragmentary detail vertical sectional view taken on the line 12—12 of Fig. 11.

Fig. 13 is a fragmentary detail plan sectional view taken on the line 13—13 of Fig. 12.

Fig. 14 is a detail perspective view on an enlarged scale showing a part of the guide for the helical tie wire in open position and also illustrating the number of coils of said wire disposed about the overlapped portions of a pair of springs of the two rows thereof.

Fig. 15 is a fragmentary detail vertical transverse sectional view on an enlarged scale, taken on the line 15—15 of Fig. 5.

Fig. 16 is a fragmentary detail vertical sectional view taken on the line 16—16 of Fig. 15.

Figure 1:
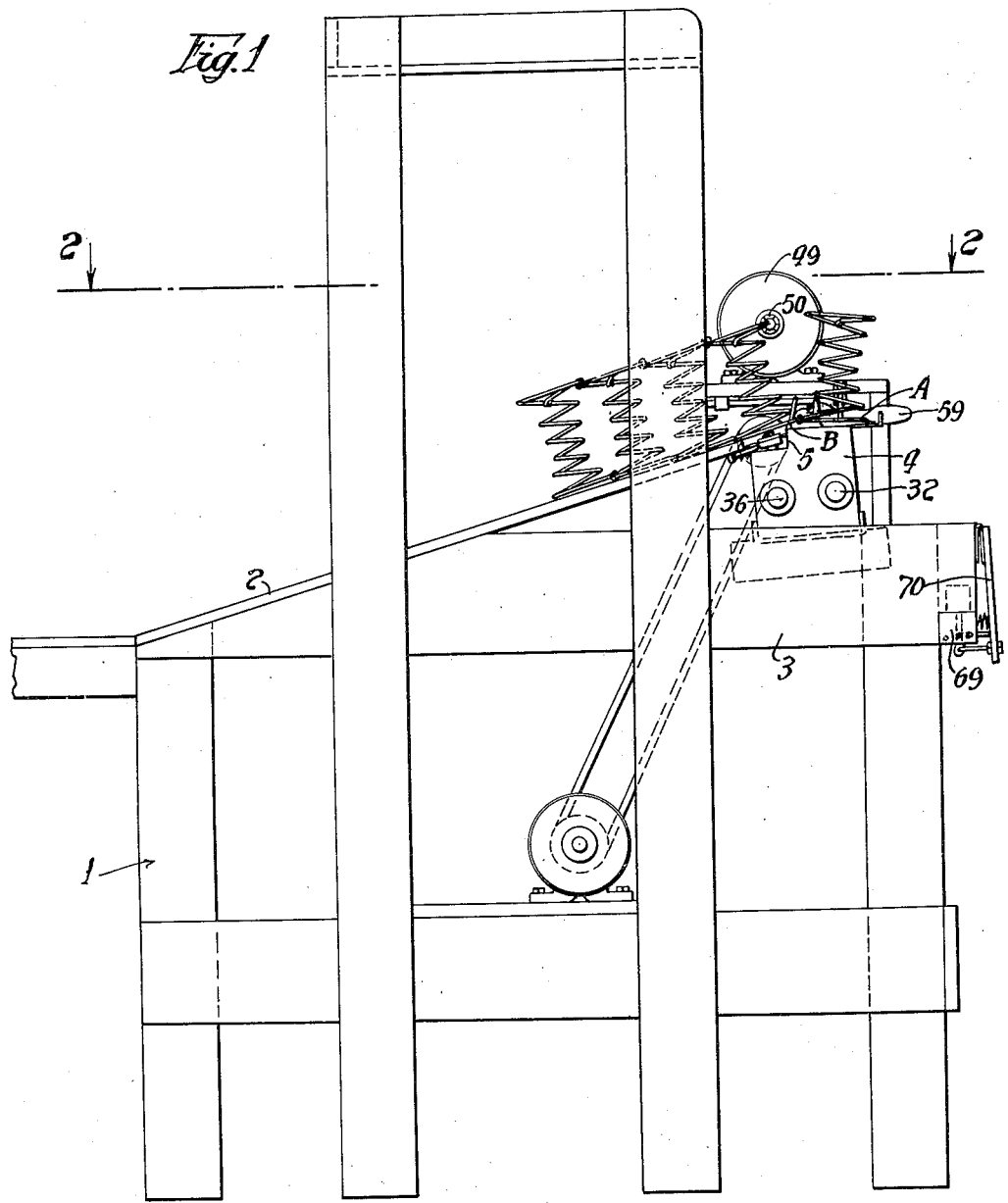
Fig. 1 is a side elevation of a machine constructed in accordance with the invention.

The coupling of successive rows of springs by means of helical tie wires to produce spring assemblies for upholstery is recognized in the art as being extremely advantageous, in that the tie wires are very resilient in all directions and thus yield to loads on the assembly in such manner that the upholstery springs of the ultimate structure may assume positions relatively to each other to conform the load-bearing surface of the assembly to the contour of the body resting upon a mattress or cushion into which the assembly is incorporated together with suitable padding in a conventional manner.

However, unless the overlapped portions of the springs are properly encircled by the helical tie wire, the ultimate assembly may be noisy, as by squeaking or by reason of the overlapped portions of the coils springing past each other to produce noises like "zing" and these are obviously undesirable and if accompanied by squeaks, are extremely annoying.

The type of spring assemblies herein referred to is among the cheapest and most popular, but is difficult of assembly by purely hand operation without injury to the fingers of the operator who must guide the helical tie wire from one pair of opposed springs to another with the fingers of one hand while holding the springs in overlapped relation with the other. Thus the sharp forward end of the helical tie wire punctures the skin of the finger-tips of the operators (usually girls) so frequently that by the time that they become fairly efficient, they resign and new operators have to be broken in.

The need of proper equipment to speed the work and prevent injury to operators' fingers is great, as is also the need for reducing costs and producing a uniformly good product and of increasing the earnings of operators and thus maintain an efficient staff of the latter in steady employment.

Owing to the fact that practically no two upholstery springs come from the coiling and knotting equipment exactly alike, the production of a machine which will attain the foregoing objects has been a problem difficult of solution, especially because of the aforesaid slight manufacturing variations in pitch of the helical tie wires. Hence, while a number of machines of the type to which this invention relates have been constructed and used with some degree of success, none known to me has resulted in the production of spring assemblies of uniform quality or of sufficiently uniform quality to overcome losses and accidents.

In order to overcome the difficulties presented by variations in pitch of the helical tie wires at different points between their ends, a novel method is involved in the present invention which consists in employing helical tie wires of less pitch, or smaller number of coils per foot, than is ordinarily used and required, so that the portions of greatest pitch of each helical tie wire used will be no greater than the predetermined pitch required to effect uniform encircling of the overlapped spring portions by said tie wire and effecting increase in pitch of the tie wire while the latter is being fed through the machine to the exact degree required to attain uniform results with respect to the number of coils encircling each pair of overlapped spring portions. This phase of the invention is reflected also in structural characteristics of the machine as will appear more fully from the following description.

As shown in Fig. 14, it is very essential that the overlapped portions of the terminal coils A and B of the two upholstery springs shall be encircled by three and one-half coils of the helical tie wire C or another predetermined number of coils, depending upon the diameter of the tie wire C, the extent to which the said portions A and B of the spring are overlapped, the diameter of said terminal coils and the gauge of the wire of which the springs are composed. Thus, while in the instance illustrated the overlapping portions A and B are encircled by three and one-half coils of the wire C, in other instances they may be encircled by two and one-half or four and one-half coils of wire C.

As shown in Fig. 1, the machine includes a suitable frame 1 upon which an inclined table member 2 is mounted rigidly. Rigidly mounted upon the right hand end portions of the frame members 3 are the slightly inclined side plates 4 provided in the upper left hand corners with recesses 5 which are opposed to the uppermost or right hand edge of the table 2. One of the plates 4 is well illustrated in Fig. 8 and in plan view in Fig. 11. In both said last-named figures there is also shown a sheet metal plate 6 equipped along its right hand edge with an upright flange 7, the said plate 6 being mounted rigidly upon the adjustable brackets 8 equipped with parallel vertical slots 9 for the passage of bolts 10 which pass through the horizontal slots 9a in the plates 4 to render said brackets 8 adjustable vertically and horizontally relatively to said plates 4.

Mounted rigidly upon the upper edges of the plates 4 is a bar 11 which is provided throughout its length with a guide groove 12 for the helical tie wires C. The upper face of the bar 11 is of slightly inverted V-shape, the planes of the two oppositely inclined surfaces thereof meeting substantially at the base of the right-hand flange 13 bordering the groove 12 (Figs. 6, 7 and 8), the said groove 12 lying between the said inclined surfaces. Said groove is arcuate in cross section and of less than semi-cylindrical depth between the portions thereof bordered by said flanges 13, the latter serving to prevent the helical tie-wires from springing out of said groove between spring encircling portions of said tie-wires (see also Figs. 15 and 16).

Mounted upon the left-hand inclined face of the bar 11 are pairs of upwardly projecting stop members 14 (Figs. 5 to 8 and Fig. 11) against which the lower terminal coils of the first row of springs placed in the machine are adapted to abut, the said stop members of each pair being so spaced apart as to cause the middle part of the arcuate portion of the coil engaged with said stops to overhang the guide groove 12 to a predetermined extent. The said stops 14 are substantially wedge shape and may be adjusted arcuately about their threaded shanks which pass through the plate 11 and receive securing nuts 15, to vary the extent to which said last-named arcuate portions of the terminal coils of the said springs overhang the groove 12.

To the left of the bar 11 (Figs. 6 and 7) there is provided a rocking bar 16 upon which guide blocks 17 are mounted at equally spaced apart points. U-shaped members are provided which include straight arm portions which pass through recesses in the blocks 17 for guidance during reciprocation of the said U-shaped members.

The said arm portions 18 are rigidly secured at their extremities to cross bars 19 which are connected by light tension springs 20 with the bar 16. The middle portions 21 of each of the said U-shaped reciprocable members are bent to extend upwardly at an angle of about ninety degrees to the plane common to the arms 18 thereof. Mounted upon the arms 18 between the cross-heads 19 and the bar 16 are adjustable stop collars 22 which limit the spring responsive movements of the member 18—21 (hereinafter referred to as members 21) relatively to the bar 16.

The springs 20 maintain the members 21 normally in the position shown in Fig. 8, the stop collars 22 being normally in contact with the bar 16. While said members 21 and bar 16 are disposed in the position of Fig. 8, the springs of the first row are inserted to the position shown in Fig. 8 with the farthest left-hand portions of the lower terminal coils of the spring resting upon the arms 18 between the stop collars 22 and the cross-bars 19 as more clearly shown in Fig. 6, and, as shown in Fig. 5, side portions of said terminal coils rest upon the guide blocks 17.

As shown in Figs. 5 and 11, the middle portions of the members 21 project through the lower coils of the first row of springs and bear against the same to force and hold said coils in engagement with the stops 14.

It will be noted by reference to Figs. 5, 6 and 7 that the members 21 project through the lower terminal coils of the springs of the first row at points adjacent the knots of said springs of the first row disposed in the machine, said knots being disposed at the right of and spaced from the next adjacent middle portion of another member 21.

It will also be noted by reference to Figs. 5 and 11, that the guide blocks 17 are adjustable longitudinally of the bar 16 in order that the vertical arms of the members 21 may be properly disposed for cooperation with the stops 14 to force and hold the springs of the first row in the desired predetermined positions relatively to the groove 12, when the bar 16 is moved toward the bar 11 to a degree to cause the stop collars 22 to be spaced from the bar 16 against the action of the spring 20.

Mounted upon the right hand inclined face of the bar 11 is a series of pairs of stops 23 (Figs. 5 and 11) which are opposed to the stops 14. The stops 23 are substantially triangular in plan view and are equipped with tapered faces opposed to the lower terminal coils of the springs of the next succeeding row disposed in the machine after the first row of the same is in place and before the bar 16 is moved toward the bar 11. Said stops 23 are also equipped with threaded shanks that pass through openings in the bar 11 and receive nuts 24 by means of which they are held secure. Said stops are also adjustable about the axes of their shanks.

Mounted upon the last-named face of the bar 11 midway between the projections 23 of the several pairs thereof, are plates 25 through which pass the pivot pins 26 engaging in projections 27 of rockers 28 which constitute clamps acting to hold overlapped spring portions firmly against relative movement as hereinafter described. The said rockers are provided in the faces thereof opposed to the groove 12 with grooves 29 also arcuate in cross section, which overhang the groove 12 for cooperation therewith to provide substantially cylindrical guides for the tie-wire C when the rockers 28 are in the position shown in Fig. 6. The said plates 25 are also adjustable longitudinally of the bar 11 for effecting accurate spacing apart of pairs of springs to be coupled by the wires C.

Said rockers 28 are connected with rocker arms 30 by means of adjustable links 31 (Figs. 6, 7 and 8). The arms 30 are rigid with a rockshaft 32 which is journalled at its ends in the plates 4 and carries a spur gear wheel 33 which is rigid with a split hub 33a equipped with an operating handle 34. Said gear wheel 33 meshes with a duplicate spur gear wheel 35 mounted upon a rockshaft 36 equipped with arms 37 upon which the bar 16 is supported.

Mounted in the bearings 38 of brackets 39, at the front of the machine frame (Fig. 5) is a reciprocable shaft 40 equipped between its ends with a collar 41 against which a compression spring 42 bears. Upon the right hand end of said shaft 40 there is mounted a cam 43 (see also Fig. 4) having a lower inclined face 44 which merges into a shoulder 45 oppositely inclined, said face 44 being normally yieldingly engaged with the handle 34 of the rockshaft 32, the latter being adapted to be swung upwardly against the resistance of the cam 43 into engagement with the shoulder 45 which cooperates with the spring 42 to retain said handle 34 in said last-named position.

Conventional means are provided to prevent rotation of the shaft 43 which, in the instance illustrated, is equipped with longitudinal slots 46 (Fig. 4) into which the shanks of set screws 47, engaged with the bearings 38, project.

Figure 4:
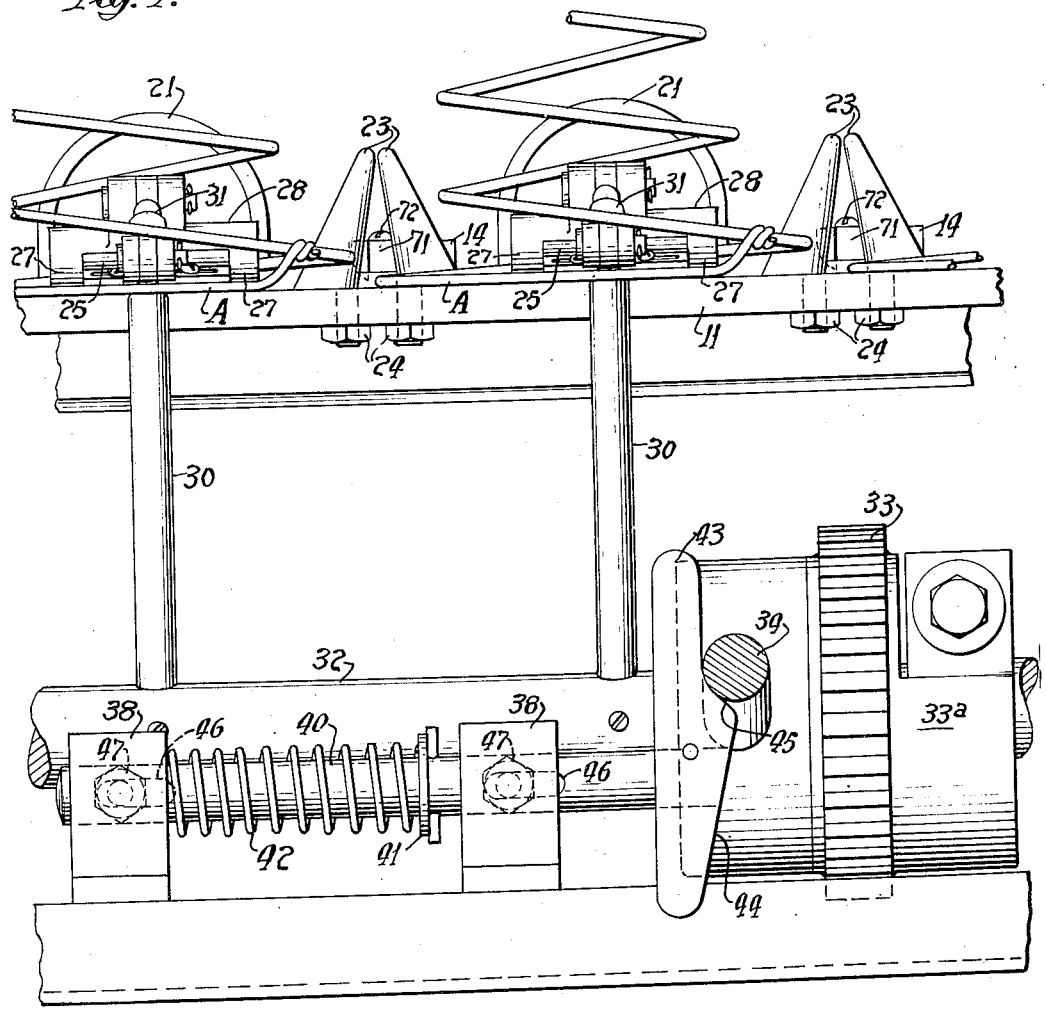
Fig. 4 is a fragmentary detail vertical sectional view on an enlarged scale, taken on the line 4—4 of Fig. 2.

The split hub 33a of the spur gear wheel 33 permits the latter and the spur gear wheel 35 to be properly adjusted to bring the bar 16 and the arm 30 into proper relation to the bar 11 to cause the springs of the first row to become disposed in their desired initial positions relatively to the stops 14 and the groove 12 as the arms 37 are swung clockwise, and also cause the rockers 28 to become disposed in the position of Fig. 6 when the handle 34 is swung into engagement with the shoulder 45 of the cam 43 as shown in Fig. 4. The links 31 will also be adjusted relatively to the arms 30 to bring about the desired position of the rockers 28 (as shown in Fig. 6) when the handle 34 is engaged with the said shoulder 45 of the cam 43.

At the right hand end of the machine frame is a track 48 (Fig. 2) upon which a reversible electric motor 49 travels. The shaft of said motor is equipped with a suitable device or chuck 50 for engaging one end of a helical tie wire C with said shaft, said tie wires being cut to desired lengths preparatory to being engaged with said device 50. Said motor is drawn toward the main frame of the machine responsively to rotation and advancement of the tie wire C along the groove 12. Further reference to the motor 49 is made hereafter.

At the right hand end of the main frame of the machine (Fig. 11) and supported at one end upon the member 4, is a plate 51 which is equipped with bearings for a drive shaft 52 suitably connected with a source of power other than the motor 49 for rotation selectively in opposite directions as by a reversible electric motor.

Figure 9:
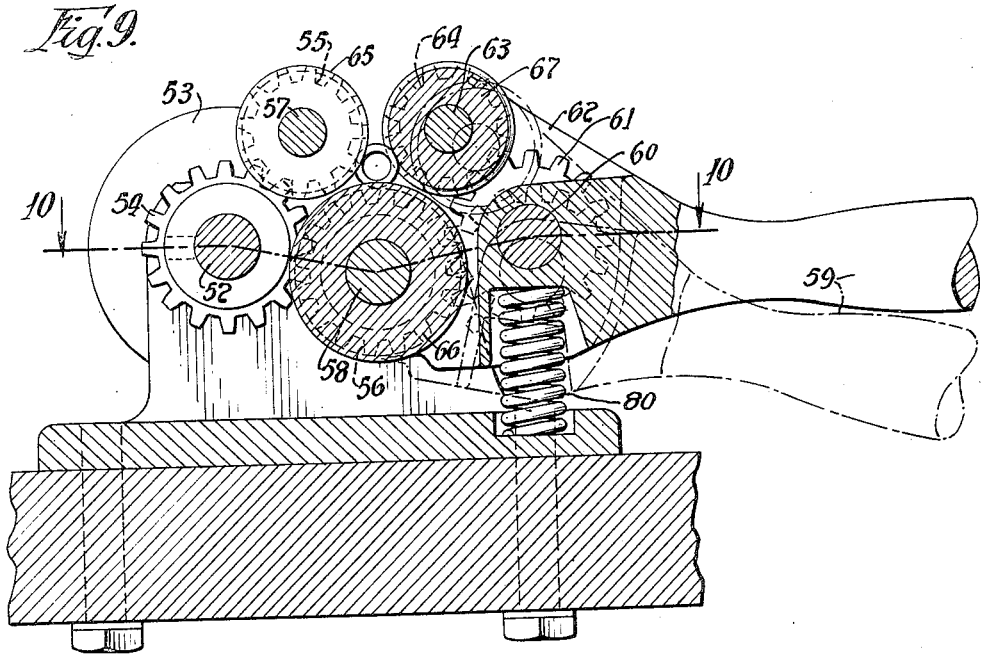
Fig. 9 is a fragmentary detail sectional view on an enlarged scale taken on the line 9—9 of Fig. 2 and illustrating the mechanism for rotating the helical tie wire.
Figure 10:
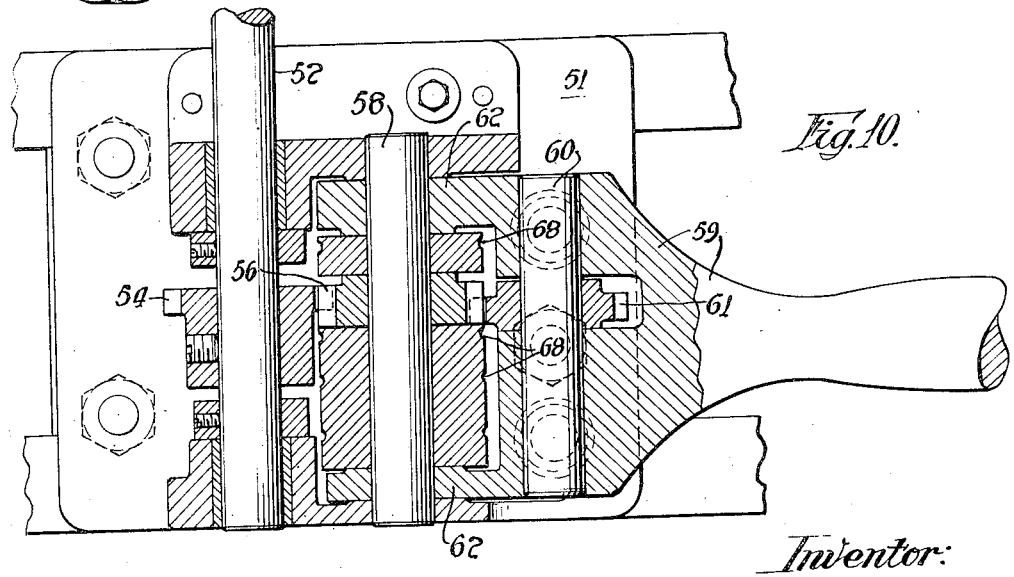
Fig. 10 is a fragmentary detail plan sectional view taken on the line 10—10 of Fig. 9.

The shaft 52 is equipped with a spur gear wheel 54 which meshes with the respective spur gear wheels 55 and 56 mounted upon the countershafts 57 and 58, respectively, which also are journalled in bearings of the plate 51 (Figs. 9–10).

The said shafts 57 and 58 rotate in the opposite direction from shaft 52.

Concentrically and pivotally mounted upon the countershaft 58 is the forked end of a hand lever 59 which is equipped with bearings for the shaft 60. The latter carries a spur gear wheel 61 which meshes at all times with the spur gear wheel 56 for rotation in the same direction as the shaft 52.

The forked end portion of the lever 59 includes the side flanges 62 in which the ends of a shaft 63 are journalled. Shaft 63 carries a spur gear wheel 64 which meshes with the spur gear wheel 61 at all times for rotation in the same direction as the spur gear wheels 55 and 56.

The several shafts 57, 58 and 63, carrying the spur gear wheels 55, 56 and 64, respectively, are equipped with annularly grooved rolls 65, 66 and 67, respectively all of which rotate at equal surface speeds in the same direction, although they differ in diameter, the grooves 68 of each of said several rolls being spaced apart a distance equal to the length of one coil of the wire C.

The grooves of the several rolls are, however, disposed in such staggered relation to each other as their differences in diameter and disposition of their axes at the corners of an irregular triangle necessitates in order that the wire C may be firmly engaged in the grooves of all of the rolls while the lever 59 is held in the full line position as shown in Fig. 9 and as hereinafter described.

The handle 59 is equipped in its lower face with a pair of sockets vertically aligned with the shaft 60 and receive the upper ends of compression springs 80 supported upon the plate 51 and which act to hold said handle normally in the full line position of Fig. 9 and roll 67 pressed against the helical tie wire for effecting rotation of the latter frictionally in cooperation with the rolls 65 and 66.

Between contiguous stops 14 of the several pairs thereof, the plate or bar 11 is equipped with members 71 secured thereto adjustably by means of set screws 72 which pass through recesses 73 in the sides of said members for permitting them to be moved along the slot 12 and also pivotally.

An end portion 74 of each member 71 projects into the groove 12 to an appreciable extent as to depth and width of said groove. Each of said portions 74 present a vertical face opposed to the feed rolls 65, 66, and 67 and an inclined face 75 which extends at an angle to the vertical face equal to or somewhat greater than the pitch of the helical tie wire, as for example, forty degrees more or less. The said vertical and inclined faces meet in the lower arcuate edge of the portion of said member 71 disposed within and over said groove and said arcuate edge meets the upper face of the member 71 in a point projecting slightly beyond the vertical plane of the axis of the groove 12.

As shown in Fig. 14, the grooves 29 of the several rockers 28 is spanned by a pair of ribs 77 which are spaced apart a distance equal to the length of one coil of the tire-wire used. Said ribs 77 perform substantially the same function as the members 71 in correcting the slight variations in pitch of the tie-wire hereinabove referred to and to prevent any serious buckling of said tie-wire when the forward extremity of the latter strikes a point in either of the overlapped spring portions to be encircled thereby, it being obvious that the driving force exerted upon the tie-wire by the grooved rollers of Figs. 9, 10 and 11 will cause the said front extremity of said wire to spring over the obstructing wire almost immediately by the crowding forward of the tie-wire by said rollers.

Obviously, the purpose of the pairs of stops 14 and 23 respectively, which are disposed in equally spaced apart relation to other pairs thereof longitudinally of the bar 11, is to cause the points, at which the lower terminal coils of the upholstery springs engaged with said several pairs of stops at one point, to be spaced equally from the similar crossing points of pairs of springs engaged with the next adjacent set of said stops.

In order that the forward end portion of the helical tie wire may encircle the overlapped portions of each of the several pairs of upholstery springs, as illustrated in Fig. 14, the variations in pitch of the tie wire must be taken into account. That variation sometimes amounts to the length of one coil of said spring in four feet or one-quarter of the length of one coil per foot of said tie wire and that variation may be plus or minus, i. e. the entire number of coils in four feet may be one more or one less than the normal number that should be comprised in that length. Generally this variation is plus to the extent of at least a fraction of a coil and that, of course, means that the pitch of the tie wire is less than normal along one or more parts of the total length of the tie wire.

The members 71 are so adjusted in position along the groove 12 that the vertical faces of their forward X-shaped end portions are spaced equally from the first crossing point of a pair of upholstery springs disposed next beyond a member 71 in the direction of travel of the helical tie wire moving along said groove responsively to rotation of the rolls 65, 66 and 67. The inclined faces of said V-shaped portions of said members 71 are engaged by the coils of the tie wire which are of less than normal pitch as said tie wire progresses along the groove and said tie wire is thus elongated by said inclined faces to the extent necessary to cause the front end of the tie wire to pass into encircling relation to the overlapped portion of the next pair of upholstery springs at the right point.

The contact of the tie wire with the said inclined face causes a downward pressure on the tie wire which serves to prevent it from springing out of the groove 12.

While, in the instance illustrated, a left hand coiled helical tie wire is shown, the structure is equally adapted for the use of right hand coiled tie wire without change in construction as to any detail of the parts shown in Fig. 14 or of the members 71.

The shaft of the motor 49 preferably is aligned with the plane of upper ends of the springs of the last row of the latter inserted and engaged in the machine. Said motor is used to rotate helical tie wires for coupling the upper terminal coils of the said last row of springs with the terminal coils of the said last row of springs with the terminal coils of the next preceding row thereof, this operation being performed in an old and well known manner with the aid of said motor, each new row of springs being first coupled with the next preceding row by the tie wire traveling in the groove 12 and said two rows then coupled at the top before another row is disposed in the machine.

The members 71 perform another important function in that they take up locally the back-pressure on the helical tie wire resulting from striking of its forward extremity against one of a pair of overlapped spring portions which tends to cause also a buckling of the tie wire. As each of the several members 71 is relatively closely proximate to the point at which the extremity of the tie wire strikes a spring and causes a compression of the tie wire, due to the uninterrupted drive thereof, such compression occurs first between the point of contact that effects either an undue resistance to travel of the tie wire or interruption of its travel, and the nearest adjacent member 71 and stores up energy in this portion of the tie wire for an instant sufficient to cause a slight buckling and consequent axial distortion of the tie wire which displaces the said extremity from its contact point and thus causes it to spring over the round wire surface in its path. If this does not occur instantly the operator becomes aware of it, and throws the lever 59 to disengage the drive rolls from the tie wire. The difficulty is then remedied digitally and the operation resumed.

Owing to the fact that appreciable frictional resistance to rotation of the tie wire builds up progressively as the latter encircles the overlapped spring portions, to which skin friction along the groove 12 and within the clamping members 28 must be added, the friction drive of the tie wire must be of sufficient power to overcome the same and in connection with the drive rolls, the members 71 act to prevent any appreciable degree of buckling of the tie wire which causes same to spring out of the groove 12, and they act also, to maintain the travel of said tie-wire uniform in harmony with its pitch and speed of rotation.

*The operation of the machine*

Referring first to Fig. 8, it will be noted that the springs B are disposed upon the arms 18 of the U-shaped members 21 hereinbefore described, with the upwardly projecting inverted U-shaped portions 21 extending through the space between the portion of the terminal coil of the spring B next adjacent the knot thereof, and the next higher coil of said spring. At this time the arms 30 and 37 are disposed in their outermost divergent positions. After the row of springs B has been mounted upon all of the members 18—21, the springs A opposed to the respective springs B are disposed as shown in Fig. 8, so that the portions of the lower terminal coils of the same directly opposed to the nearest adjacent portions of the springs B, overhang the groove 12 of the bar 11.

As soon as the two rows of springs A and B are disposed in said respective positions lastabove described, with the springs A resting upon the supporting plate 6, the handle 34 is swung upwardly from the position shown in Fig. 8 to the position shown in Fig. 6, thereby causing the portions of the lowermost coils of the springs B immediately opposed to the nearest adjacent portions of the springs A to become disposed in overlapped relation to the latter; this being accomplished by the action of the spring 20 upon the arms 18 to force the members 21 against the opposed portion of the terminal coil of the spring at spaced apart points adjacent to the stops 14 so that said springs B are thus brought into the position shown in Figs. 5 and 6.

At the same instant that the members 21 are brought to the position shown in Figs. 5 and 6, the members 28 move into overhanging position relatively to the groove 12 with their outermost edge portions resting upon the bar 11 at the left hand side of the groove 12.

During this swinging movement of the members 28 to the last-named position, the ends of said members 28 defining the grooves therein become engaged with the terminal coils of the springs A and B now overlapped over the groove 12 at points spaced from the overlapped portions of said springs and thus hold said springs firmly in the overlapped position shown in Figs. 5 and 6.

A helical tie wire is then disposed for engagement by the rollers 55 and 56 and in the path of the roller 64 which is then spaced from the roller 55 as indicated in dotted line in Fig. 9.

The lever 59 is then swung to the position shown in Fig. 9 and as the shaft 52 of the roller 54 which meshes with the gear wheel associated with the roller 55 is in constant rotation, the helical tie wire is now rotated in the direction to cause it to enter the groove 12 and encircle successively the overlapped portions of the springs A and B so long as the lever 59 is in the full line position of Fig. 9.

It will be noted that the compression spring 80 is disposed in engaging relation to the lever 59 in a socket of the latter, said spring being swung to opposite sides of its dead center position with respect to the axis of rotation of the lever 59 when the letter is swung from its dotted line to its full line position of Fig. 9 and thus acts to hold the said lever yieldingly in said respective positions so that when the latter is in its full line position the tie wire will be rotated.

While the said lever 59 is in the full line position the operator watches the progress of the helical tie wire through the groove 12 and in the event that the forward end of the tie wire shall strike an obstruction or shall be misplaced as to any pair of the overlapped spring portions about which it is encircling itself, the operator has to do no more than depress the lever 59 and stop the forward travel of the tie wire or the lever 59 may be retained in its full line position and the rotation of the drive rolls reversed to effect retraction of the tie wire by operating the reversing switch of the actuating motor, such retraction being limited to the extent necessary to effect such little adjustment as may be necessary to cause the tie wire to properly encircle the overlapped spring portions of the pair of springs to the left of the forward end of the tie wire.

During this operation of rotating the tie wire to encircle the overlapped spring portion, the spacing or correcting device 71 functions as described hereinabove.

After the helical tie wire C has completely encircled all of the overlapped portions of the springs A and B, as aforesaid, the right hand end portion of said tie wire will have passed out of engagement with the drive rolls. Said wire is of greater length than required and the surplus is cut away at one or both ends after the whole assembly has been completed.

After completing the last-described operation the now coupled pair of rows of springs are left in the machine while the operator couples the upper ends of said springs by means of a tie wire rotated by the motor 49, the springs being manipulated digitally ahead of the forward extremity of the tie wire to bring them into the same overlapping positions with respect to their upper terminal coils as is effected by the above-described mechanism with respect to their lower terminal coils. This operation is conventional in character.

Following each of the last-named operations, the said lever 34 is swung downwardly to the position shown in Fig. 8 thereby causing the arms 30 and 37 to separate and causing the members 28 to turn upwardly to the position shown in Figs. 7 and 8. During this movement of the arms 30 and 37 the bars 16 and guide member 17 strike the stops 22 on the arms 18 and cause the vertical portions 21 of the member 18 to strike the next to lowermost coils of the spring D to move the said spring back from the groove 12 as shown in Fig. 7, thus withdrawing the helical tie wire C and the overlapper portions of the springs encircled thereby out of the groove 12.

The now coupled rows of springs A and B are lifted clear of the member 21 and the stops 23, the latter obviously determining the extent to which the lowermost coils of the spring A overlap the groove 12 and thereupon the left hand end portions of the springs A (Figs. 6, 7 and 8) are moved to the position previously occupied by the springs B in the primary operation of the machine. Another row of springs A is then disposed in place in the same manner as the first-named row of said springs A and thereupon the foregoing operations are repeated, it being obvious that the left hand portions of the lowermost coils of the springs A and B are alike.

The motor 49 is operated independently of the motor which actuates the tie wire drive rolls, the currents of the latter being controlled by a conventional switch while the circuit through the motor 49 is controlled by a switch 69 associated with the pressure plate 70 (Fig. 1) which is opposed inwardly to cause the circuit through the motor 49 to be closed, the latter being drawn along its track in the direction of travel of the tie wire which it rotates by pull of the latter. Said motor 49 is not of the reversible type and necessitates manual reverse rotation of the tie wire connected with the chuck 50 to effect retraction of the same.

Resistance to advancement of the helical tie-wire along the groove 11 is built up by frictional contact with the wall of said groove and also by contact with overlapped spring portions. This causes the tie-wire to expand slightly radially and shorten axially so that its forward extremity is apt to not follow its true helical path within the groove and cause the front extremity of said wire to strike a point in one of the overlapped springs at the side of the overlap nearest the actuating mechanism and where said spring portion crosses a side edge of the groove 11. When this occurs the tie-wire may be stopped as to both rotation and travel. The members 71 overcome this difficulty by cooperation with the actuating mechanism (drive rolls) to effect normal accurate travel of the tie wire along the groove to prevent the above mentioned contingency and cause the tie-wire to begin each encircling of overlapped spring portions at a predetermined point.

I claim as my invention:

1. A machine of the type specified comprising a frame member equipped with a guide groove for a helical tie-wire, mechanism at one end of said groove for rotating and advancing a helical tie-wire along said groove, spaced apart pairs of spring locating stops mounted upon said member at respective sides of said groove at regular intervals, a manually operable pivoted clamping member disposed between each pair of said stops along one side of said groove for cooperation with said stops to hold one spring of a pair in engagement with each pair of the latter, manually operable means associated with the several pairs of stops along the opposite side of said groove for holding the companion springs of the pair engaged with the last named stops and in partially overlapped relation to the first-named springs.

2. In a machine of the type specified, the combination with power actuated manually controlled means for rotating and axially advancing a helical tie-wire, of a rigid frame member equipped with a groove to receive the said wire, a plurality of pairs of spaced apart spring locating stops disposed at regular intervals along one side of said groove to receive arcuate terminal spring portions therebetween to overlap said groove, manually operable clamping devices associated with said stops for cooperation therewith to maintain said springs engaged with said stops and in the path of said wire, companion pairs of stops along the opposite side of said groove, and manually operable means disposed for cooperation with said last-named stops for holding companion springs to those first-named in overlapping relation to the latter and in the path of said wire for encircling of both said spring portions overlapping said groove.

3. In a machine of the type specified, the combination with power actuated manually controlled means for rotating and axially advancing a helical tie-wire, of a rigid frame member equipped with a groove to receive the said wire, a plurality of pairs of spaced apart spring locating stops disposed at regular intervals along one side of said groove to receive arcuate terminal spring portions therebetween to overlap said groove, manually operable clamping devices associated with said stops for cooperation therewith to maintain said springs engaged with said stops and in the path of said wire, companion pairs of stops along the opposite side of said groove, and manually operable means disposed for cooperation with said last-named stops for moving companion springs to those first-named and holding the same in overlapping relation to the latter and in the path of said wire for encircling of both said spring portions overlapping said groove.

4. In a machine of the type specified, the combination with power actuated manually controlled means for rotating and axially advancing a helical tie-wire, of a rigid frame member equipped with a groove to receive the said wire, a plurality of pairs of spaced apart spring locating stops disposed at regular intervals along one side of said groove to receive arcuate terminal spring portions therebetween to overlap said groove, pairs of spaced apart stops opposed to the first-named stops disposed along the opposite side of said grooves, and manually operable means associated with said respective pairs of stops for holding said respective spring portions engaged with said stops and in overlapping relation to said groove and each other in the path of said wire, said last-named manually operable means including clamping means for maintaining said spring portions supported upon said frame member and against movement away from said groove.

5. In a machine of the type specified, the combination with power actuated manually controlled means for rotating and axially advancing a helical tie-wire, of a rigid frame member equipped with a groove to receive the said wire, a plurality of pairs of spaced apart spring locating stops disposed at regular intervals along one side of said groove to receive arcuate terminal spring portions therebetween to overlap said groove, pairs of spaced apart stops opposed to the first-named stops disposed along the opposite side of said grooves, and manually operable means associated with said respective pairs of stops for holding said respective spring portions engaged with said stops and in overlapping relation to said groove and each other in the path of said wire, said last-named manually operable means including clamping means for maintaining said spring portions supported upon said frame member and against movement away from said groove, and cam devices projecting laterally into said groove at points between pairs of stops and in the path of coils of the tie-wire for engagement by the latter and cooperation with said first-named means for promoting advancement of said wire along said groove.

6. In a machine of the type specified, a rigid bar having a continuous longitudinal groove in its upper face, pairs of spring-stop devices rigidly mounted on said bar at opposite sides of said groove with said stops of each pair so spaced apart as to cause arcuate portions of the terminal coils of springs abutting the same to overlap said groove, a spring carrier disposed opposite the pairs of stops at one side of said groove, means reciprocable relatively to and mounted upon said carrier in engaging relation to the springs carried by the latter for moving springs thereon into engagement with the stops opposed thereto, devices equipped with grooves adapted to be opposed to the first-named groove pivotally mounted on said bar in cooperative relation to the other pairs of stops for initial engagement with springs to be coupled with those on the carrier for holding said second set of springs in overlapping relation to said first-named groove and said other springs as said devices are moved to cause the grooves thereof to register with the groove of said bar to form substantially cylindrical guides for a helical tie-wire, manually operable means for moving and maintaining said reciprocable means and said devices to hold the respective sets of springs in overlapped relation over said first-named groove, and means for rotating and feeding a helical tie-wire through said first-named groove in encircling relation to said overlapped spring portions.

7. In a machine of the type specified, the combination with manually controlled mechanism for rotating a helical tie-wire and advancing the same, of a member equipped with a groove axially aligned with the axis of rotation of said tie-wire, pairs of spring stops rigidly mounted upon said member on respectively opposite sides of the said groove in opposed relation to each other, devices movably mounted on said member at one side of said groove and provided with grooves adapted to register with the first-named groove when said devices are disposed at one limit of their movement relatively to the said member, said devices interposed between the stops of the several pairs disposed at one side of the first-named groove and adapted to project through the terminal coils of a row of springs engaged with the last-named stops, a carrier for a companion row of springs spaced from the said member and movable toward and from the same and equipped with devices adapted to project through the terminal coils of said springs of the last-named row and located in opposed relation to said devices, and manually operable means common to the latter and said carrier for moving said devices to the first-named groove preparatory to advancing said tie-wire into encircling relation to the overlapped portions of said springs.

8. In a machine of the type specified, a member equipped with a continuous longitudinal groove, mechanism for rotating and advancing a helical tie-wire along said groove, pairs of equally spaced apart stops disposed upon opposite sides of said groove in relative positions to cause the lower terminal coils of opposed rows of upholstery springs to be coupled by a tie-wire to partially overlap each other above said groove when said terminal coils are engaged with said respective pairs of stops, a series of devices pivotally mounted on said member at one side of said groove between the stops of the respective pairs on that side of the groove and arranged to project through the lower terminal coils of the row of springs on that side as the latter are disposed in engagement with said last-named stops, said devices equipped with grooves adapted to register with the first-named groove as said devices are swung to the other limit of their movement, a movable carrier for springs of the other row disposed opposite the said member in opposed relation to the said devices and equipped with devices adapted to project through terminal coils of the other row of springs as the latter are disposed upon said carrier, and manually operable means for throwing said devices and said carrier to cause the former to attain the last-mentioned limit of its movement and thereby hold the springs engaged thereby in contact with the adjacent stops and move said carrier to bring the other row of springs into contact with the other pairs of stops preparatory to rotating and advancing said tie-wire.

9. A machine of the kind specified including a bar equipped with a continuous longitudinal groove, means for rotating and advancing a helical tie-wire along said groove, a series of pairs of stops mounted on said member along one side of said groove, a movable spring carrier disposed adjacent one side of said member and adapted to be moved to cause springs carried thereby to be brought into engagement with said pairs of stops and in overlapping relation to said groove, a companion series of pairs of stops mounted on said member along the other side of said groove, movable spring engaging devices associated with said last-named stops and equipped with grooves adapted to overhang and register with said first-named groove as said devices are moved from one to another position to maintain said last-named springs engaged with said last-named stops with parts of said terminal coils overlapping the first-named groove, and manually operable means for throwing said devices and said carrier to said respective positions preparatory to rotating and advancing said tie-wire along said groove.

10. A machine of the kind specified including a bar equipped with a continuous longitudinal groove, manually controlled power actuated means for rotating and advancing a helical tie-wire along said groove, a series of pairs of stops mounted on said member along one side of said groove, a movable spring carrier disposed adjacent one side of said member and adapted to be moved to cause springs carried thereby to be brought into engagement with said pairs of stops and in overlapping relation to said groove, a companion series of pairs of stops mounted on said member along the other side of said groove, movable spring engaging devices associated with said last-named stops and equipped with grooves adapted to overhang and register with said first-named groove as said devices are moved from one to another position to maintain said last-named stops engaged with parts of said terminal coils overlapping the first-named groove, and manually operable means for throwing said devices and said carrier simultaneously to said respective positions preparatory to rotating and advancing said tie-wire along said groove.

11. A machine of the kind specified including a bar equipped with a continuous longitudinal groove, manually controlled power actuated means for rotating and advancing a helical tie-wire along said groove, said machine including a series of pairs of stops mounted on said member along one side of said groove, a movable spring carrier disposed adjacent one side of said member and adapted to be moved to cause springs carried thereby to be brought into engagement with said pairs of stops and in overlapping relation to said groove, a companion series of pairs of stops mounted on said member along the other side of said groove for positioning springs opposed to the first-named springs in overlapping relation to said groove and parts of said first-named springs and movable means associated with said last-named stops for cooperation with said carrier to hold the respective sets of springs in said overlapping relation to each other and said groove preparatory to rotating and advancing said tie-wire, and manually operable means for simultaneously moving said carrier and movable means into positions wherein the respective sets of springs are disposed in their said overlapping positions and so maintaining the same.

12. A machine of the kind specified including a bar equipped with a continuous longitudinal groove, manually controlled power actuated means for rotating and advancing a helical tie-wire along said groove, said machine including a series of pairs of stops mounted on said member along one side of said groove, a movable spring carrier disposed adjacent one side of said member and adapted to be moved to cause springs carried thereby to be brought into engagement with said pairs of stops with parts of said springs overlapping said groove, a companion series of pairs of stops mounted on said member along the other side of said groove for positioning springs opposed to the first-named springs in overlapping relation to said groove and parts of said first-named springs, and movable means associated with said last-named stops for cooperation with said carrier to hold the respective sets of springs in said overlapping relation to each other and said groove and against movement relatively to said bar preparatory to rotating and advancing said tie-wire, manually operable means for simultaneously moving said carrier and movable means into positions wherein the respective sets of springs are disposed in their said overlapping positions, and a spring-held device associated with said last-named means for holding the same in said last-named position.

13. In a machine of the type specified, a bar equipped with a continuous longitudinal groove for the progressive reception of a helical tie-wire of a diameter to fit said groove, manually controlled mechanism for rotating and advancing a helical tie-wire along said groove, means for maintaining overlapped arcuate portions of terminal coils of the springs of two parallel rows thereof in overlapped relation to each other and in overhanging relation to said groove with the points of contact of the springs of one row with those of the other row disposed substantially in the axis of said groove and thereby disposing said overlapped portions of said springs in position to be encircled by said helical tie-wire, said means cooperating to maintain the overlapped coils of one row thereby to maintain the other terminal coils of the springs of one row spaced from those of the other row.

14. In a machine of the type specified, a bar equipped with a continuous longitudinal groove for the progressive reception of a helical tie-wire of a diameter to fit said said groove, manually controlled mechanism for rotating and advancing a helical tie-wire along said groove, means for maintaining overlapped arcuate portions of terminal coils of the springs of two parallel rows thereof in overlapped relation to each other and in overhanging relation to said groove with the points of contact of the springs of one row with those of the other row disposed substantially in the axis of said groove and thereby disposing said overlapped portions of said springs in position to be encircled by said helical tie-wire, said means cooperating to maintain the overlapped coils of one row thereby to maintain the other terminal coils of the springs of one row spaced from those of the other row, and cam projections extending into said groove at intervals along the length thereof for cooperation with said mechanism for effecting substantially uniform advancement of said tie-wire along said groove.

15. In a machine of the type specified, a bar equipped with a continuous longitudinal groove for the progressive reception of a helical tie-wire of a diameter to fit said groove, manually controlled mechanism for rotating and advancing a helical tie-wire along said groove, means for maintaining overlapped arcuate portions of terminal coils of the springs of two parallel rows thereof in overlapped relation to each other and in overhanging relation to said groove with the points of contact of the springs of one row with those of the other row disposed substantially in the axis of said groove and thereby disposing said overlapped portions of said springs in position to be encircled by said helical tie-wire, said means cooperating to maintain the overlapped coils of one row thereby to maintain the other terminal coils of the springs of one row spaced from those of the other row, and cam projections extending into said groove at intervals along the length thereof and in the path of said tie wire for engagement by the latter for cooperation with said mechanism for effecting substantially uniform advancement of said tie-wire along said groove.

16. In a machine of the type specified, a bar equipped with a continuous longitudinal groove for the progressive reception of a helical tie-wire of a diameter to fit said groove, manually controlled mechanism for rotating and advancing a helical tie-wire along said groove, means for maintaining overlapped arcuate portions of terminal coils of the springs of two parallel rows thereof in overlapped relation to each other and in overhanging relation to said groove with the points of contact of the springs of one row with those of the other row disposed substantially in the axis of said groove and thereby disposing said overlapped portions of said springs in position to be encircled by said helical tie-wire, said means cooperating to maintain the overlapped coils of one row thereby to maintain the other terminal coils of the springs of one row spaced from those of the other row, and cam projections rigidly mounted adjacent to and projecting into said groove into the path of the tie-wire at points between pairs of overlapped springs for engagement with said tie wire and cooperation with said mechanism for advancing said tie wire along said groove.

FRED R. ZIMMERMAN.